United States Patent

[11] 3,588,843

[72] Inventor Kenneth D. Labaugh
Nashua, N.H.
[21] Appl. No. 777,809
[22] Filed Nov. 21, 1968
[45] Patented June 28, 1971
[73] Assignee Sanders Associates, Inc.
Nashua, N.H.

[54] LOGARITHMIC CLOCK
26 Claims, 4 Drawing Figs.

[52] U.S. Cl. .......... 340/172.5
[51] Int. Cl. .......... H03k 5/156
[50] Field of Search .......... 340/172.5; 235/157; 324/68; 328/63, 55; 307/269

[56] References Cited
UNITED STATES PATENTS
3,014,181 12/1961 Filipowsky .......... 328/55

*Primary Examiner*—Raulfe B. Zache
*Attorney*—Louis Etlinger

ABSTRACT: A system for generating pulses whose timing is substantially in accordance with a logarithm of the elapsed number of linear (periodic) clock pulses employs an accumulator and a backward counter, both of which count clock pulses. A count detector emits an output pulse whenever the count in the backward counter reaches zero. A data shifting network thereupon transfers the contents of the accumulator into the backward counter and the latter immediately recommences counting its clock pulses until it reaches zero again, while the accumulator continues counting upwardly. Thus, the detector emits a train of output pulses whose spacing increases exponentially.

FIG I

INVENTOR.
KENNETH D. LABAUGH
BY
ATTORNEY

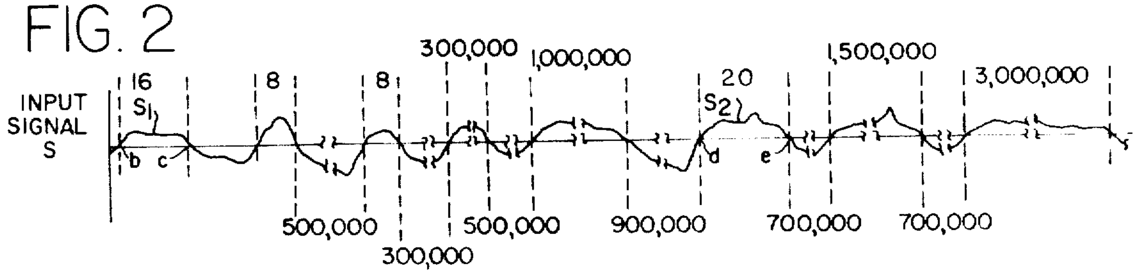
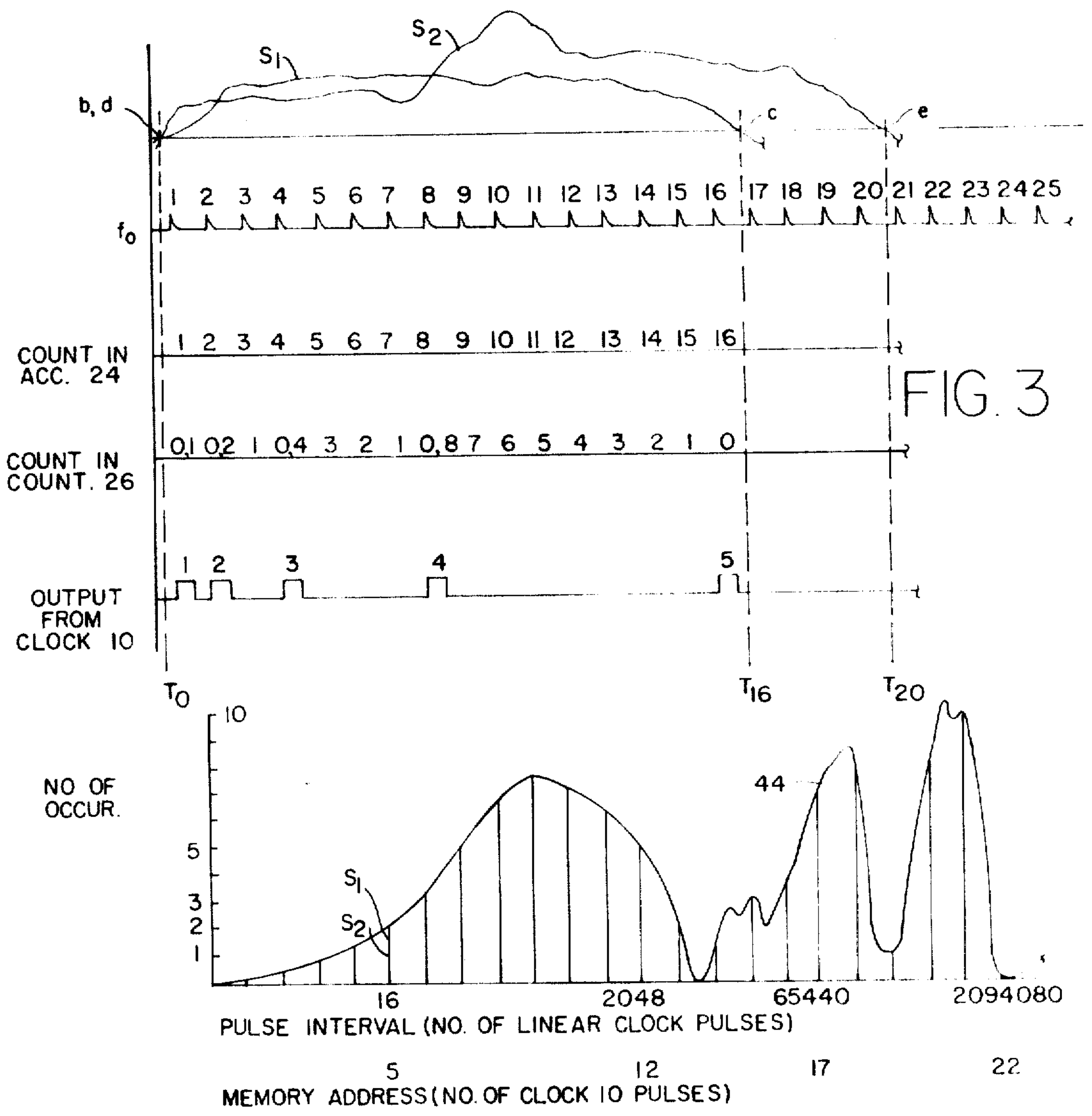
FIG. 2
FIG. 3, FIG. 4
INVENTOR.
KENNETH D. LABAUGH
BY
ATTORNEY

LOGARITHMIC CLOCK

BACKGROUND OF THE INVENTION

This invention relates to an electronic timing system. It relates more particularly to an electronic clock which generates output pulses at times substantially proportional to the logarithm of the number of periodic clock pulses that have elapsed.

The system described herein has a number of applications. For example, it may be used as a sampling frequency generator to control the rate of sampling of an electrical signal. It has particular application as a reference signal generator in various types of signal analyzers and comparators.

To illustrate, it is often desirable to obtain a statistical picture of the pulse durations of a quasi-periodic signal (each "-pulse" being the interval between successive zero axis crossings of the signal). Normally, this is done by counting the number of locally generated clock pulses occurring during each pulse. The system then stores in a memory the number of occurrences of each of the measured pulse durations. In a system with 100 memory addresses or "bins," the number of occurrences of each of 100 different pulse durations can be stored. After measuring many pulse durations, the system builds up a distribution pattern of the durations. This pattern may then be compared with the pattern produced by a known type of signal, e.g. a particular code.

Normally, the dynamic range of such a system is limited by the number of memory "bins" therein. That is, a 100 "bin" system employing a linear clock has a dynamic range of 100 to 1. This means that if this system can measure pulse durations as short as 1 clock pulse period, the maximum pulse durations accommodated by the system will be 100 clock pulses. Consequently, unless a very large memory is used, a system using a linear clock is not capable of building up a meaningful distribution pattern for pulses which vary greatly in duration.

The obvious way to extend the dynamic range of the system is to enlarge its memory capacity to, say 10,000 "bins." Needless to say, however, this solution entails a concomitant increase in the cost and complexity. A much better and less expensive solution is to employ a nonlinear clock such as the one disclosed herein, which generates signals on a gradually expanding time scale.

SUMMARY OF THE INVENTION

Accordingly, it is an object of this invention to provide an electronic timing system for extending the dynamic range of a system for measuring the pulse durations of quasi-periodic or aperiodic signals.

A further object is to provide an improved system for measuring the duration of quasi-periodic or aperiodic signal intervals.

A further object of the invention is to provide an electronic clock which generates clock pulses on an expanding time scale.

Another object of the invention is to provide a clock which generates pulses at intervals substantially proportional to a logarithm of the elapsed time.

A still further object is to provide a relatively simple logarithmic clock employing conventional electrical components.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the present system measures pulse durations as before, by counting the number of measuring pulses occurring between the zero axis crossings of the signals. However, the system generates the measuring pulses on an expanding time scale so that there are proportionately fewer pulses for the longer pulse durations in the signals being examined than there would be if the pulses were linearly periodic with time. Specifically, it generates a number of pulses proportional to a logarithm of the number of linear (periodic) clock pulses between the axis crossings of the signal. The circuit that generates the measuring pulses is thus a logarithmic clock because it "takes the logarithm" of the time intervals it measures.

The logarithmic clock employs an accumulator which counts pulses produced by a linear clock at a rate of $f_0$. It commences counting upon the occurrence of the beginning of the interval to be measured, i.e. a zero axis crossing of the monitored signal.

The very first output pulse in each pulse train from the logarithmic clock is generated by a count detector which detects a selected count, e.g. $X_0$, in the accumulator. Upon the occurrence of the first measuring pulse, i.e. $X_0$ linear clock pulses after the beginning of the interval to be measured, a data shifting network loads the count then in the accumulator, i.e. $X_0$, into a backward counter which immediately commences counting backward until its count reaches zero. The accumulator, on the other hand, continues counting upwardly.

The backward counter may count at a slower or faster rate than the counting rate $f_0$ of the accumulator register. The backward counter counting rate is $1/a$ times $f_0$ for $a$ ranging from zero to infinity. When the backward counter reaches zero, after $aX_0$ linear clock pulses at the $f_0$ rate, a zero contents detector emits an output pulse which constitutes the second output pulse of the logarithmic clock. Again, the count in the accumulator is loaded into the backward counter, with the latter starting once more to count to zero.

This process continues and, as described in detail below, the number of output pulses from the logarithmic clock is logarithmically related to the number of linear clock pulses during the same interval. More specifically, the number of output pulses is logarithmically related to the elapsed time since the beginning of the interval to be counted.

The system continues to provide output pulses until the signal being examined again crosses the zero axis, at which time the system is reset to ready it for measurement of the next interval in the input signal.

Since the output pulses from the timing system are spaced progressively further apart, only a relatively few of them are needed to measure a very long time interval. For example, if the base 2 is used for the logarithmic relationship the logarithmic clock may emit only 10 pulses to indicate an interval corresponding to 512 linear clock pulses.

If the present timing arrangement is used as the reference clock in the aforementioned 100 "bin" system for measuring pulse intervals, the dynamic range may be as large as 4,000,000:1 depending upon the settings of the variable elements of the system. This gives a system having the same memory capacity much greater flexibility. An operator can use the system to recognize signals which may vary very widely in absolute time duration, but which maintain fixed relationships with one another. Yet, with all these advantages, the logarithmic clock employs only a relatively few electrical components, all of which are conventional and relatively inexpensive. Moreover, it needs no sensitive adjustment.

BRIEF DESCRIPTIONS OF THE DRAWINGS

For a fuller understanding of the nature and objects of the invention, reference should be had to the following detailed description taken in connection with the accompanying drawings, in which:

FIG. 2 is a graphical representation of a typical signal containing pulses whose durations may be examined by the FIG. 1 system;

FIG. 3 is a graphical representation of the operation of the various elements of the FIG. 1 system; and FIG. 4 is a graphical representation showing a typical distribution pattern of pulse durations measured with the FIG. 1 system.

DESCRIPTION OF THE PREFERRED EMBODIMENT

Figure 1:
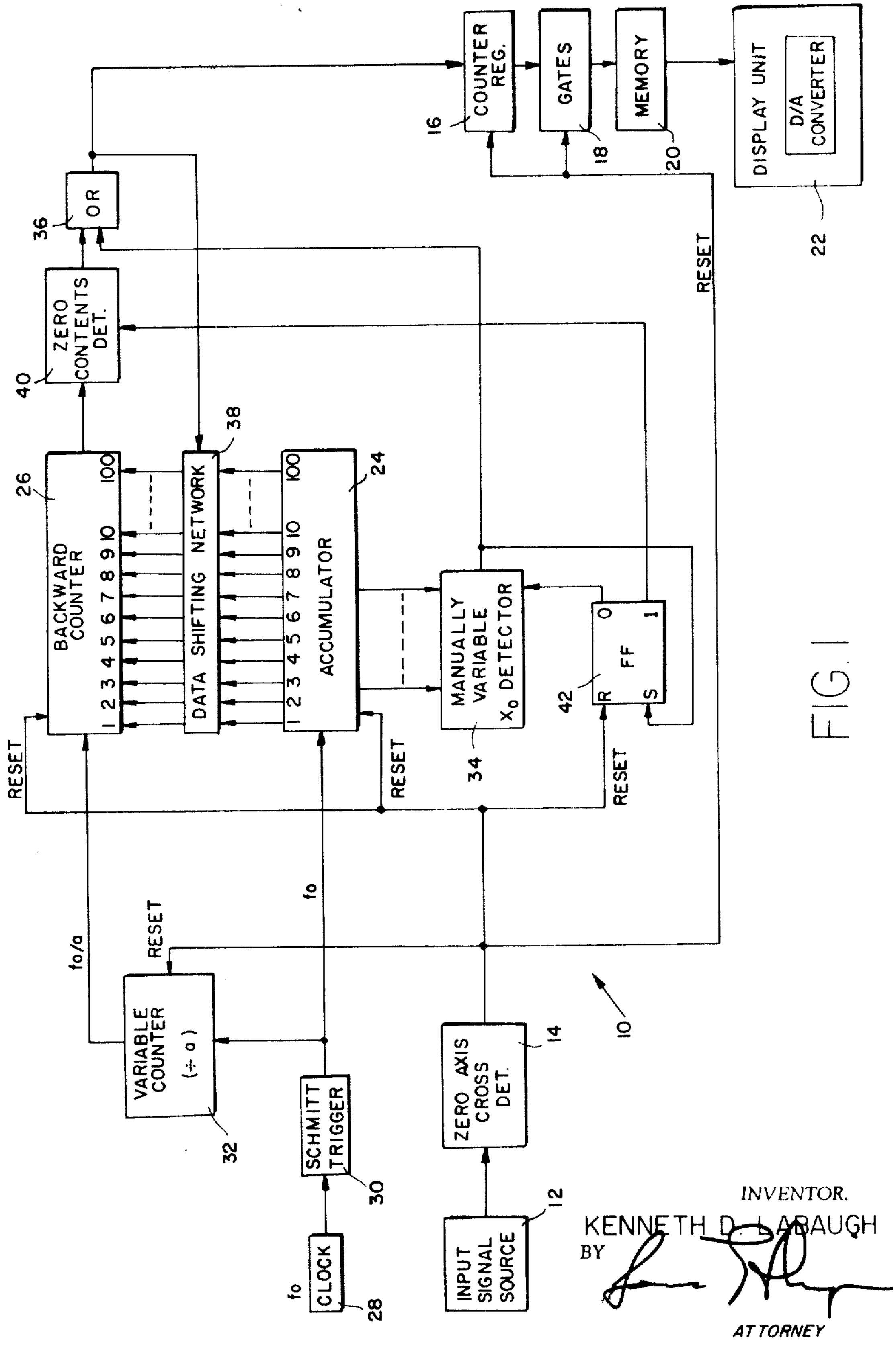
FIG. 1 is a block diagram of a timing system made in accordance with this invention used in a system for measuring the durations of various pulses.

Referring now to FIG. 1, a logarithmic clock indicated generally at 10 is used as the reference source in a system for measuring pulse durations in a quasi-periodic pulse signal S from an input signal source 12. The signal S is applied to a zero axis crossing detector 14 which generates an output pulse each time the input signal crosses the zero axis. Thus, the intervals between successive pulses from detector 14 demark the pulse durations in the input signal from source 12. Each pulse from detector 14 resets the clock 10 so that it commences generating output pulses in a nonlinear fashion as will be described in detail later.

The output pulses from clock 10 are counted by a counter register 16 whose contents then represent the total number of output pulses emitted from clock 10 during an interval between successive pulses from detector 14, i.e. during a given pulse in the input signal S. Each pulse from detector 14 enables a set of gates 18 which transfer the information then in the counter register 16 to a memory 20. The detector 14 pulse also resets both clock 10 and counter register 16 to place the system in a position to measure the duration of the next pulse in the input signal S. Thus, successive trains of pulses from clock 10 are counted by register 16 and these, counts, which correspond to successive pulse duration in the input signal, are recorded in the memory 20.

Each occurrence of a particular number in register 16 is recorded at a memory 20 address or "bin" corresponding to that number. When a given count is repeated, the number in the corresponding memory address is increased by one, so that the content of each memory address is the number of occurrences of the particular pulse duration corresponding to that address. Therefore, after several such measurements, a distribution pattern of pulse durations is stored in memory 20. This information can then be read out of the memory into a display unit 22 which converts the contents of the memory addresses to voltage analogs and displays the resulting pattern 44 on a suitable screen. (See FIG. 4).

In the display, the pulse durations increase substantially in accordance with the logarithm of the displacement along the horizontal axis in display unit 22. This feature is very useful in permitting an operator to recognize signals which vary in absolute time duration, but which maintain relatively fixed relationships. That is, if the system builds up a distribution picture where certain relationships predominate, the operator will then know that the signals from source 12 were generated according to a particular code or process. Differences in the signal rates from one time to another are reflected as shifts of the displayed patterns to the right or to the left in FIG. 4. However, the size and shape of the displayed patterns will not change. Because of the time compression provided by the logarithmic clock 10, very large signal rate variations can be accommodated by the system.

As shown in FIG. 1, clock 10 comprises a digital accumulator (counter) 24 and a backward counter 26. Both must have the same capacity in order to effect the lossless transfer of contents from accumulator 24 to counter 26. In the present example of a system having a 100 "bin" memory 20, counter register 16 is capable of a 100 count. Accumulator 24 and counter 26 have 100 binary elements each and are capable of counting to $2^{100}$.

A linear clock comprises an oscillator 28 whose output is converted to a sequence of periodic pulses by a Schmitt trigger 30 incorporating a suitable differentiating circuit. These pulses, which have a frequency $f_0$, are applied directly to accumulator 24 so that the accumulator always counts at the full linear clock rate. The output of trigger 30 is also applied to a variable frequency divider (counter) 32, thereby generating a train of pulses whose repetition rate is $f_0/a$; these pulses are counted by backward counter 26. The factor $a$ is a number which may be less than, equal to or greater than one. In any case, counter 24 counts at the full clock rate $f_0$ while the counter 26 counts at a rate which may be greater than, equal to or less than $f_0$ depending upon the value of $a$.

Accumulator 24 commences counting pulses from clock 28 upon the occurrence of the first zero axis crossing of signal S. A variable initial count ($X_0$) detector 34 is connected to monitor the contents of accumulator 24. When the count in accumulator 24 reaches $X_0$, detector 34 emits an output pulse by way of an OR circuit 36 to counter register 16. This is the first output pulse of the logarithmic clock 10. Accordingly, $X_0$ corresponds to a selected number of linear clock pulses in the interval between the axis crossing and the first output pulse from logarithmic clock 10.

A data shifting network 38 is arranged to shift the contents of accumulator 24 into backward counter 26 upon the occurrence of each output signal from OR circuit 36. Then counter 26 immediately commences counting backwards from $X_0$ at the rate $f_0/a$ until it reaches zero. Accumulator 24, on the other hand, continues accumulating pulses at the basic clock rate $f_0$. When counter 26 reaches zero after $aX_0$ linear clock pulses, this condition is sensed by a zero contents detector 40 which immediately emits an output pulse to register 16 via OR circuit 36. This constitutes the second output pulse from logarithmic clock 10, and it lags the first pulse by $aX_0$ linear clock pulses, i.e. the time it took counter 26 to count from $X_0$ to zero. At this point, the total number of linear clock pulses $p$ from the beginning of the pulse duration to be measured is given by:

$$p(2)=X_0+X_0=X_0(1+a) \qquad (1)$$

The second output pulse from OR circuit 36 also causes data shifting network 38 to load the contents of accumulator 24, i.e. $X_0(1+)$ into counter 26. While accumulator 24 continues counting upwardly from that point at the basic rate, counter 26 commences counting backwards to zero from that point at the rate $f_0/a$ which may be greater than, equal to, or less than $f_0$. Counter 26 thus reaches zero after a further time interval of $aX_0(1+a)$ linear clock pulses. Thereupon, detector 40 produces the third pulse in the output train from logarithmic clock 10. In terms of the basic clock rate, the total elapsed time is:

$$p(3)=X_0(1+a)+X_0(1+a)=X_0(1+a)^2. \qquad (2)$$

In the above three examples, the relationship between the total number $p$ of linear clock pulse and the number $n$ of output pulses from the logarithmic clock 10 follows the formula:

$$p(n)=X_0(1+a)^{n-1}. \qquad (3)$$

This formula also governs succeeding output pulses: Let $r=n-1$ be the number of output pulses. Then:

$$p(r)=X_0(1+a)^{r-1}. \qquad (4)$$

This quantity will be loaded into the backward counter 26 on the occurrence of the $r^{th}$ output pulse. The counter 26 will then reach zero after:

$$aX_0(1+a)^{r-1}. \qquad (5)$$

further linear clock pulses, at which time the $(r+1)^{th}$ output pulse will be emitted. The total number of clock pulses will then be:

$$p(r+1)=X_0(1+a)^{r-1}+aX_0(1+a)^{r-1} \qquad (6)$$

$$=X_0(1+a)^{r-1}(1+a) \qquad (7)$$

$$=X_0(1+a)^r \qquad (8)$$

But, $r=n-1$ and $n=r+1$, therefore:

$$p(n)=X_0(1+a)^{n-1} \qquad (9)$$

From equation (9), a logarithmic expression for $n$ can be derived as follows:

$$(1+a)^{n-1}=p(n)/X_0 \qquad (10)$$

$$n-1=\log_{(1+a)}[p(n)/X_0] \qquad (11)$$

or $$n=1+\log_{(1+a)}[p(n)/X_0] \qquad (12)$$

Thus, the number of clock 10 output pulses is a logarithmic function of the elapsed number $p(n)$ of linear clock pulses.

By proper selection of $a$, the number $n$ may be related to $p$ by any of a variety of logarithmic bases. For example, by setting $a$ equal to nine, one may relate $n$ to $p$ as a logarithm to the base 10.

As mentioned previously, all pulses in the train from logarithmic clock 10 after the first one originate in detector 40. The first one is produced "artificially" by detector 34. To insure that detector 34 contributes only the first pulse in each output train, it is suppressed immediately following the first pulse from clock 10, while detector 40 is suppressed until after that first pulse.

The suppression of both detectors 34 and 40 is accomplished by a single flip-flop 42. At the beginning of each signal S interval being measured, the pulse from zero axis crossing detector 14 resets the flip-flop 42. The ensuing output of the flip-flop enables detector 34 and disables detector 40. Then the first output pulse which comes from detector 34 sets the flip-flop. This disables detector 34 and enables detector 40. From this point on, all of the output pulses in the train from clock 10 originate in zero contents detector 40, until the next pulse from detector 14 marking the next zero axis crossing of the signal being examined.

FIG. 2 illustrates a typical input signal S which may be examined by the FIG. 1 system. The signal S comprises many pulses demarked by the zero axis crossings of the signal S. The pulse durations in signal S vary greatly in length, the shortest corresponding to eight pulses from linear clock 28 and the longest pulse corresponding to 3,000,000 linear clock pulses. Also, it will be noticed that some of the pulse durations in signal S are the same or approximately the same length. For example, pulse $S_1$ has a length or duration of 16 linear clock pulses, while pulse $S_2$ has a duration of 20 linear clock pulses. The illustrated system having a memory capacity of 100 "-bins" is capable of measuring the complete range of pulse intervals represented in signal S. In fact, it can measure intervals as short as one period of clock 28 to as long as several million such clock pulse periods depending on the values of $X_0$ and $a$.

Referring to 1. 1 and 3, we will describe the operation of the system as it measures the duration of pulse $S_1$. This pulse is bounded by the zero axis crossings of signal S at points $b$ and $c$. When the signal S crosses the zero axis at point $b$, detector 14 (FIG. 1) emits a pulse which resets accumulator 24 and counters 26 and 32, and also resets flip-flop 42 to ready the logarithmic clock 10 for measuring the length of pulse $S_1$. The same signal from detector 14 also loads the contents of register 16, corresponding to the number of pulses in the previous train developed by clock 10, into memory 20 and resets register 16.

At this point, accumulator 24 and counter 26 both contain a count of zero. The counter 32 has been manually set to divide by the desired value of $a$, and the desired initial count $X_0$ has been set into detector 34. Flip-flop 42 enables detector 34 and suppresses zero contents detector 40. For purposes of simplicity of illustration, we will assume both $X_0$ and $a$ equal one. In actual practice, however, $X_0$ is greater than or equal to one and $a$ may be any number between zero and infinity.

Accumulator 24 immediately commences counting pulses from linear clock 28 at the basic rate $f_0$. When the contents in accumulator 24 equals the number $X_0$, i.e. one, and is set into detector 34, detector 34 emits the first output pulse from clock 10 following the zero axis crossing at $b$ and which appears at the output of OR circuit 36. This is designated as clock 10 output pulse 1 in FIG. 3; it coincides with the first pulse $f_0$ from linear clock 28. Output pulse 1 also switches flip-flop 42 to its other state, thereby disabling detector 34 and enabling detector 40. Further, it enables data shifting network 38 to transfer the contents of accumulator 24 at that instant, i.e. a one count, into counter 26.

Counter 26 immediately commences counting backwards from one to zero, whereupon detector 40 emits an output pulse to OR circuit 36 which constitutes the second output pulse from the clock 10. This second pulse is designated pulse 2 in FIG. 3. Since in this example counter 26 counts at the same rate as accumulator 24 (i.e. $a=1$) output pulse 2 trails pulse 1 by one clock pulse. Therefore, pulse 2 corresponds to the second linear clock pulse from the beginning of the input signal pulse $S_1$ being examined.

Output pulse 2 from clock 10 also causes network 38 to load the contents then in accumulator 24 into counter 26. By this time accumulator 24 has accumulated a count of two. Therefore, the number two is loaded into backward counter 26. Again, counter 26 immediately commences counting to zero, whereupon detector 36 emits the third output pulse in the train from clock 10 (pulse 3 in FIG. 3). Pulse 3 trails pulse 2 by two linear clock pulses and is spaced four linear clock 28 pulses from the axis crossing point $b$.

By this time, accumulator 24 has increased its count to four so that when pulse 3 enables network 38, the number four is loaded into counter 26. As before, counter 26 counts backwards to zero, whereupon detector 40 emits pulse 4 in the output train. Pulse 4 lags pulse 3 by four clock pulses and is spaced eight linear clock pulses from point $b$. In the same fashion, pulse 4 gives rise to output pulse 5, which lags pulse 4 by eight linear clock pulses and correspond to the 16th pulse from linear clock 28.

Shortly thereafter, input signal S again crosses the zero axis at point $c$. Consequently, detector 14 emits a pulse which resets accumulator 24, and counters 26 and 32, and flip-flop 42; this pulse also gates the contents of register 16 into memory 20 and resets register 16. The system then immediately commences measuring the duration of the signal S pulse beginning at point $c$ (FIGS. 2 and 3) in the same fashion as described above.

As seen in FIG. 3, a comparison of the output of logarithmic clock 10 and that of linear clock 28 shows that the number of linear clock pulses between the axis crossing point $b$ and successive output pulses from clock 10 increases exponentially. Specifically, the successive output pulses of clock 10 are spaced from point $b$ by successively increasing powers of 2 in terms of the linear clock pulses, i.e. the clock 10 pulses occur at 1, 2, 4, 8, 16, 32 .....$2^{n-1}$ linear clock pulse positions. Therefore, the output pulses from clock 10 occur at intervals governed by the following expression:

$$n=1+\log_{(1+a)}[p(n)/X_0] \qquad (13)$$

by using the logarithm to the base 2, i.e., by setting $a$ equal to one and also setting $X_0$ equal to one, Equation (13) reduces to:

$$n=1+\log_2 p \qquad (14)$$

In this example, a count of five in register 16 (FIG. 1) corresponds to an interval of 16 linear clock pulses. Yet a count of only 12 in register 16 indicates a pulse interval of $2^{11}$ or 2048 linear clock pulses.

It will be apparent from FIG. 3 that the uncertainty of each pulse interval determination corresponds to the number of linear clock pulses between successive clock 10 and output pulses. With larger numbers of output pulses, the number of linear clock pulses between successive output pulses is greater and the absolute accuracy of measurement diminishes. However, because of the logarithmic relationship between the output pulses and the linear clock pulses, the relative accuracy remains the same percentage.

In the same fashion, the present system measures the durations of the successive pulses making up the input signal S from source 12 (FIG. 1). Each different count in register 16, corresponding to a different pulse duration, is stored at a different address in memory 20. Further, each time the system detects the same pulse duration, the count in the corresponding address in memory 20 is increased by one.

Thus, memory 20 builds up a distribution pattern of the pulse intervals in the signal S. This is illustrated graphically in FIG. 4 where each small vertical segment indicates one occurrence of a pulse duration in a particular range of pulse durations. In the illustration, each such range corresponds to the difference between successive pulse counts of the logarithmic clock 10, as registered by counter register 16. For example, FIG. 4 shows pulses $S_1$ and $S_2$, having durations of 16 and 20 linear clock pulses, respectively, as both having the logarithmic clock count of five. All other pulse durations in the range of 16 to 31 linear clock intervals, will similarly have a logarithm clock count of five.

The display unit 22, (FIG. 1) contains a digital-to-analog converter that converts the contents of the respective memory 20 addresses into voltages representing these contents. As the display unit sequences through successive memory addresses, these voltages are displayed vertically at successive horizontal positions in the display. The result is a curve such as the curve 44 in FIG. 4, which reflects the distribution pattern of the pulse durations in signal S. This pattern may be compared with the distribution pattern of a known coded signal to determine if signal S is also such a coded signal.

In this way, the present system can measure very widely varying pulse intervals, even though it has a relatively limited memory capacity. As mentioned above, an operator can recognize signal patterns, such as code, in which the components may vary widely in absolute time duration, but maintain relatively fixed relationships with one another. Yet this wide dynamic range is accomplished without an undue increase in the cost or complexity of the apparatus as a whole.

It will be apparent that numerous changes may be made in the system described above without departing from the scope of the invention. For example, the factor $a$ equation (12) may be made less than one by inserting the frequency divider 32 ahead of the accumulator 24 instead of the backward counter 26. And if only the factor $a=1$ is needed, the frequency divide 32 may be eliminated. Or a factor $f_{o/f}$, which may be a rational or irrational number may be obtained instead of $a$ by using separate and unrelated frequency sources ahead of both the accumulator and the backward counter. That is, the input frequency to the backward counter 26 would be $f_1$ while the input frequency to the accumulator 24 would remain as $f_o$. Formula (9) would become $$p(n)=X_0\left(1+\frac{f_0}{f_1}\right)^{n-1} \qquad (14)$$

where $a=\frac{f_0}{f_1}$

The counter 26 need not be a backward counter, although that is the simplest way to provide its function. It can be any other device arranged to provide a signal after a number of linear clock pulses corresponding to the content of the accumulator 24 at the time of the previous such signal.

Finally, the linear clock 28 may be replaced by a nonlinear clock. Thus if the clock 28 is a logarithmic clock of the type described above, the clock 10 will operate as a log log clock. For this reason, the clock 28 might aptly be termed an input clock.

It will thus be seen that the objects set forth above, among those made apparent from the preceding descriptions are efficiently attained, and since certain changes may be made in the above construction without departing from the scope of the invention, it is intended that all matter contained in the above description or shown in the accompanying drawings shall be interpreted as illustrative and not in a limiting sense. Other variations and extensions of the arrangement described herein will also be apparent.

I claim:

1. A signal generator comprising:
A. a source of clock signals;
B. a first counter arranged to count said clock signals;
C. a second counter arranged to count said clock signals;
D. a count detector connected to detect the count in said second counter, said detector emitting an output signal whenever the count in said second counter equals a selected count; and
E. means for shifting the contents of said first counter into said second counter upon the occurrence of each said output signal so that the said detector emits a train of output signals whose intervals of occurrence increase.

2. A signal generator as defined in claim 1 wherein said first and second counters count in opposite directions.

3. A signal generator as defined in claim 1 and further including means for causing said first and second counters to count at different rates.

4. A signal generator as defined in claim 3 wherein the ratio of the counting rates of said second and first counters is a rational number.

5. A signal generator as defined in claim 3 wherein the ratio of the counting rates of said second and first counters is an integer.

6. A signal generator as defined in claim 1 wherein said clock signals are uniformly spaced.

7. A signal generator as defined in claim 1 wherein said clock signals are logarithmically spaced.

8. A signal generator as defined in claim 1 and further including means for inserting selected initial count in said second counter.

9. A signal generator as defined in claim 1 and further including means for resetting said counters so as to interrupt said train of output signals.

10. Apparatus as defined in claim 1, and further including:
A. means for providing an input signal;
B. means responsive to said input signal for initializing said counters at the start and end of the duration of said input signal;
C. means for counting said output signals in each train;
D. a memory arranged to store each different count in said last-named counting means at a different memory address therein;
E. a digital-to-analog converter arranged to convert the contents of each memory address in said memory to an analog voltage; and
F. display means operative in response to the output from said converter for providing a graphical display of the input signal pulse durations.

11. A signal generator comprising:
A. a first source of clock signals;
B. a second source of clock signals;
C. a first counter arranged to count said clock signals of said first source;
D. a second counter arranged to count said clock signals of said second source;
E. a count detector connected to detect the count in said second counter, said detector emitting an output signal whenever the count in said second counter equals a selected count; and
F. means for shifting the contents of said first counter into said second counter upon the occurrence of each said output signal so that the said detector emits a train of output signals whose intervals of occurrence increase.

12. A signal generator as defined in claim 11 wherein said first and second counters count in opposite directions.

13. A signal generator as defined in claim 11 wherein the frequencies of said clock signal sources are different such that said first and second counters count at different rates.

14. A signal generator as defined in claim 13 wherein the ratio of the counting rates of said second and first counters is a rational number.

15. A signal generator as defined in claim 13 wherein the ratio of the counting rates of said second and first counters is an irrational number.

16. A logarithmic clock comprising:
A. a source of clock signals;

B. an accumulator arranged to accumulate a count of said clock signals;
C. a backward counter arranged to count said clock signals;
D. a detector arranged to;
  1. detect a count of zero in said backward counter, and
  2. emit an output signal whenever said zero count is detected; and
E. a data shifting network connected to shift the contents of said accumulator into said counter upon the occurrence of each said output signal whereby said detector emits a train of output signals whose intervals of occurrence increase exponentially.

17. A logarithmic clock as defined in claim 16 and further including means for causing said counter to count backwards at a different rate than said accumulator accumulates.

18. A logarithmic clock as defined in claim 16 and further including means for actuating said data shifting network when a selected initial count is contained in said accumulator so as to initiate operation of the clock.

19. A logarithmic clock as defined in claim 18 and further including means for suppressing said actuating means following the first output signal from the clock.

20. A logarithmic clock as defined in claim 16 and further including a further counter coupled to said clock source for dividing the frequency $F_0$ of said clock signals by a factor *a*, and means for coupling said clock signals of frequencies $F_0$ and $F_{0/a}$ to different ones of said accumulator and backward counter whereby said accumulator and backward counter count at different rates.

21. A logarithmic clock as defined in claim 16 and further including:
A. a variable count detector connected to said accumulator to detect a selected count in said accumulator, and to emit a first output signal whenever said selected count is detected, said first signal being applied as an enabling signal to said network; and
B. a combining network for combining said first output signal of the variable count detector and the output signals of said zero count detector.

22. A logarithmic clock as defined in claim 21 and further including means:
A. enabling said variable count detector and disabling said count detector until after the first output signal from the clock; and
B. disabling said variable count detector and enabling said count detector following the first output signal from the clock.

23. A logarithmic clock as defined in claim 16 and further including means for resetting said accumulator to zero.

24. A system for measuring the duration of the pulse durations in an input signal comprising:
A. a clock for providing clock signals;
B. an accumulator arranged to accumulate a count of said clock signals;
C. a backward counter;
D. an adjustable counter;
  1. connected between said clock and said backward counter, and
  2. arranged to emit clock signals to said backward counter at a selected submultiple of the basic rate of said clock;
E. a variable count detector coupled to said accumulator to;
  1. detect a selected count in said accumulator, and
  2. emit the first output signal from the system;
F. means for suppressing said variable detector following said output signal therefrom;
G. a zero contents detector connected to;
  1. detect a zero count in said backward counter, and
  2. emit an output signal in response thereto;
H. a data shifting network arranged to transfer the contents of said accumulator into said backward counter upon the occurrence of each signal from said detectors, whereupon said counter counts back to zero from the number just loaded into it while said accumulator continues to accumulate so that the output signals from the system occur in numbers proportional to the logarithm of the elapsed number of signals from said clock; and
I. a combining network for combining said first output signal and the output signal of said zero contents detector to produce said output signals.

25. The system defined in claim 24 and further including:
A. an additional counter arranged to count signals from said detectors; and
B. means for resetting said counters and said detectors at the beginning and end of each pulse interval in the input signal being examined.

26. The system as defined in claim 25 and further including:
A. a memory arranged to store each different count in said additional counter at a different memory address therein;
B. means for gating the contents of said additional counter into said memory at the end of each pulse interval being examined, said contents representing the duration of the pulse interval of the input signal being examined;
C. a digital-to-analog converter connected to convert the contents of the addresses in said memory to analog voltages; and
D. means responsive to said voltages for providing a visual indication of said pulse interval.